(12) United States Patent
Medley

(10) Patent No.: US 11,055,597 B2
(45) Date of Patent: Jul. 6, 2021

(54) RFID MAGNET AND METHOD OF MAKING

(71) Applicant: MAGNUM MAGNETICS CORPORATION, Marietta, OH (US)

(72) Inventor: Keith Medley, Marietta, OH (US)

(73) Assignee: MAGNUM MAGNETICS CORPORATION, Marietta, OH (US)

( * ) Notice: Subject to any disclaimer, the term of this patent is extended or adjusted under 35 U.S.C. 154(b) by 0 days.

(21) Appl. No.: 16/755,446

(22) PCT Filed: Oct. 12, 2018

(86) PCT No.: PCT/US2018/055644
§ 371 (c)(1),
(2) Date: Apr. 10, 2020

(87) PCT Pub. No.: WO2019/075350
PCT Pub. Date: Apr. 18, 2019

(65) Prior Publication Data
US 2020/0242442 A1 Jul. 30, 2020

Related U.S. Application Data

(60) Provisional application No. 62/572,093, filed on Oct. 13, 2017.

(51) Int. Cl.
*G06K 19/077* (2006.01)
*H04B 15/02* (2006.01)

(52) U.S. Cl.
CPC ....... *G06K 19/07758* (2013.01); *H04B 15/02* (2013.01)

(58) Field of Classification Search
None
See application file for complete search history.

(56) References Cited

U.S. PATENT DOCUMENTS

| | | | | |
|---|---|---|---|---|
| 3,941,633 A | * | 3/1976 | Wang | A43B 23/0235 156/77 |
| 5,869,148 A | * | 2/1999 | Silverschotz | H01F 41/16 427/128 |
| 7,405,656 B2 | * | 7/2008 | Olsen | G06K 19/07749 156/60 |
| 9,112,272 B2 | * | 8/2015 | Finn | G06K 19/07769 |
| 9,300,251 B2 | * | 3/2016 | Khitun | H03D 9/00 |
| 9,460,769 B2 | * | 10/2016 | Nozaki | H01L 43/08 |
| 10,445,634 B2 | * | 10/2019 | Khoche | B32B 37/12 |
| 2004/0074974 A1 | * | 4/2004 | Senba | G06K 19/041 235/492 |
| 2005/0174241 A1 | * | 8/2005 | Olsen | G06K 19/0776 340/572.8 |
| 2008/0122631 A1 | * | 5/2008 | Kodukula | G06K 19/0723 340/572.8 |
| 2009/0015376 A1 | * | 1/2009 | Xiang | G06K 19/0672 340/10.1 |

(Continued)

FOREIGN PATENT DOCUMENTS

CN 209690968 U * 11/2019
KR 20020081826 A * 10/2002

*Primary Examiner* — Chico A Foxx
(74) *Attorney, Agent, or Firm* — Vorys, Safer, Seymour and Pease LLP; William L. Klima

(57) ABSTRACT

An RFID magnet including an RFID label or tag applied onto a magnetized or magnetizable sheet or strip.

14 Claims, 4 Drawing Sheets

(56) References Cited

U.S. PATENT DOCUMENTS

| | | | |
|---|---|---|---|
| 2010/0219252 A1* | 9/2010 | Kikuchi | H01Q 1/2225 |
| | | | 235/488 |
| 2012/0301132 A1* | 11/2012 | Mitskog | B32B 7/12 |
| | | | 396/448 |
| 2014/0209691 A1* | 7/2014 | Finn | G06K 19/07794 |
| | | | 235/492 |
| 2015/0129665 A1* | 5/2015 | Finn | B23K 26/40 |
| | | | 235/492 |
| 2015/0136858 A1* | 5/2015 | Finn | H01Q 7/00 |
| | | | 235/492 |
| 2015/0235122 A1* | 8/2015 | Finn | H01Q 1/2283 |
| | | | 235/439 |
| 2015/0278671 A1* | 10/2015 | Martin | G06K 19/0776 |
| | | | 235/492 |
| 2015/0313325 A1* | 11/2015 | West | A41H 43/00 |
| | | | 428/99 |
| 2015/0379391 A1* | 12/2015 | Pantaloni | G06K 19/07758 |
| | | | 24/303 |
| 2016/0044841 A1* | 2/2016 | Chamberlain | H04R 25/60 |
| | | | 174/350 |
| 2016/0092763 A1* | 3/2016 | Murphy | G06K 7/10425 |
| | | | 340/10.42 |
| 2016/0365644 A1* | 12/2016 | Finn | H01Q 7/00 |
| 2016/0375673 A1* | 12/2016 | Lautzenhiser | E04F 13/0866 |
| | | | 156/176 |
| 2017/0299089 A1* | 10/2017 | Bourgeois | A61L 29/085 |

\* cited by examiner

RFID MAGNET AND METHOD OF MAKING

FIELD

The present invention is directed to a radio-frequency identification (RFID) magnet ("RFID magnet"), and a method of making the RFID magnet.

BACKGROUND

Currently, there exist magnets comprising or consisting of a sheet of magnetized or magnetizable material. For example, the sheet of magnetized or magnetizable material comprises magnetic particles embedded or mixed into a formed binder layer. Typically, the magnets are die cut from the sheet of magnetized or magnetizable material into individual magnets. These magnets, for example, can be use as advertising specialty magnets or direct mail advertising magnets.

When attempting to apply an RFID label having an RFID chip onto such a magnet, the magnetic field of the magnet interferes with scanning of the RFID chip making the scanning inconsistent.

There exists a need for an RFID magnet that can be consistently and positively scanned.

SUMMARY

The presently described subject matter is directed to an improved magnet.

The presently described subject matter is directed to an RFID magnet.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer, further comprising an adhesive layer located between the magnetized or magnetizable material layer and the rubber steel layer.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer, further comprising an adhesive layer located between the magnetized or magnetizable material layer and the rubber steel layer, wherein the adhesive layer is a rubber based adhesive layer.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, further comprising a film covering and protecting the RFID chip.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, further comprising a film covering and protecting the RFID chip, wherein the film adheres or laminates the RFID chip to the magnetic field blocking layer.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic field blocking layer is configured to block interference by the magnetized or magnetizable material layer when the magnet is being scanned to provide consistent positive scanning.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer, wherein the rubber steel layer has a thickness of 0.025 inches.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer, wherein the rubber steel layer has a thickness of 0.025 inches, wherein the magnetized or magnetizable material layer has a thickness of 0.012 inches.

The presently described subject matter is directed to a radio-frequency identification (RFID) magnet, comprising or consisting of a magnetized or magnetizable material layer; a magnetic interference blocking layer adhered or laminated onto the magnetize material layer; and an RFID chip adhered or laminated onto the magnetic interference blocking layer, wherein the magnetic interference blocking layer is a rubber steel layer, further comprising an adhesive layer located between the magnetized or magnetizable material layer and the rubber steel layer, wherein the rubber steel layer has a thickness of 0.025 inches, wherein the magnetized or magnetizable material layer has a thickness of 0.012 inches, and wherein the rubber based adhesive layer has a thickness of 0.001 inches.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, further comprising an adhesive layer located between the magnetized or magnetizable material layer and the rubber steel layer.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, further comprising an adhesive layer located between the magnetized or magnetizable material layer and the rubber steel layer, wherein the adhesive layer is a rubber based adhesive layer.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the RFID label or tag comprises comprising a film layer covering and protecting the RFID chip and RFID antenna.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the RFID label or tag comprises comprising a film layer covering and protecting the RFID chip and RFID antenna, and wherein the film adheres or laminates the RFID chip and RFID antenna to the magnetic field blocking layer.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic field blocking layer is configured to block interference by the magnetized or magnetizable material layer when the magnet is being scanned to provide consistent positive scanning.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, wherein the rubber steel layer has a thickness of 0.025 inches.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, wherein the rubber steel layer has a thickness of 0.025 inches, and wherein the magnetized or magnetizable material layer has a thickness of 0.012 inches.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, further comprising an adhesive layer located between the magnetized or magnetizable material layer and the rubber steel layer, wherein the rubber steel layer has a thickness of 0.025 inches, wherein the magnetized or magnetizable material layer has a thickness of 0.012 inches, and wherein the rubber based adhesive layer has a thickness of 0.001 inches.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, further comprising an adhesive layer located between the rubber steel layer and both the RFID chip and RFID antenna.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the magnetic interference blocking layer is a rubber steel layer, further comprising an adhesive layer located between the magnetized or magnetizable material layer and the rubber steel layer, and further comprising another adhesive layer located between the rubber steel layer and both the RFID chip and RFID antenna.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the RFID chip stores and processes information.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the RFID antenna receives and transmits an RFID signal.

The presently described subject matter is directed to a radio-frequency identification (RFID) magnet, comprising or consisting of a magnetized or magnetizable material layer; a magnetic interference blocking layer adhered or laminated onto the magnetized or magnetizable material layer; and an RFID label or tag adhered or laminated onto the magnetic interference blocking layer, the RFID label comprising an RFID chip connected to an RFID antenna, wherein the RFID chip stores and processes information, and wherein the RFID antenna receives and transmits an RFID signal.

The RFID magnet according to the present invention comprises or consists of a magnet; a rubber steel sheet adhered or laminated onto the magnet; and an RFID label having an RFID chip adhered or laminated onto the rubber steel sheet. For example, a the RFID magnet comprises or consists of a magnet layer, a rubber steel sheet layer adhered on laminated onto the magnet layer, and an RFID label layer having a RFID chip adhered or laminated onto the rubber steel sheet layer.

The method according to the present invention comprises or consists of providing a magnet, adhering or laminating a rubber steel sheet to the magnet; and adhering or laminating an RFID label to the rubber steel sheet, the RFID label having an RFID chip. For example, the method is a method of making an RFID magnet, comprising or consisting of providing a magnet layer; adhering or laminating a rubber steel sheet layer to the magnet layer; and adhering or laminating an RFID label having an RFID chip onto the rubber steel sheet layer.

DETAILED DESCRIPTION

Figure 1:
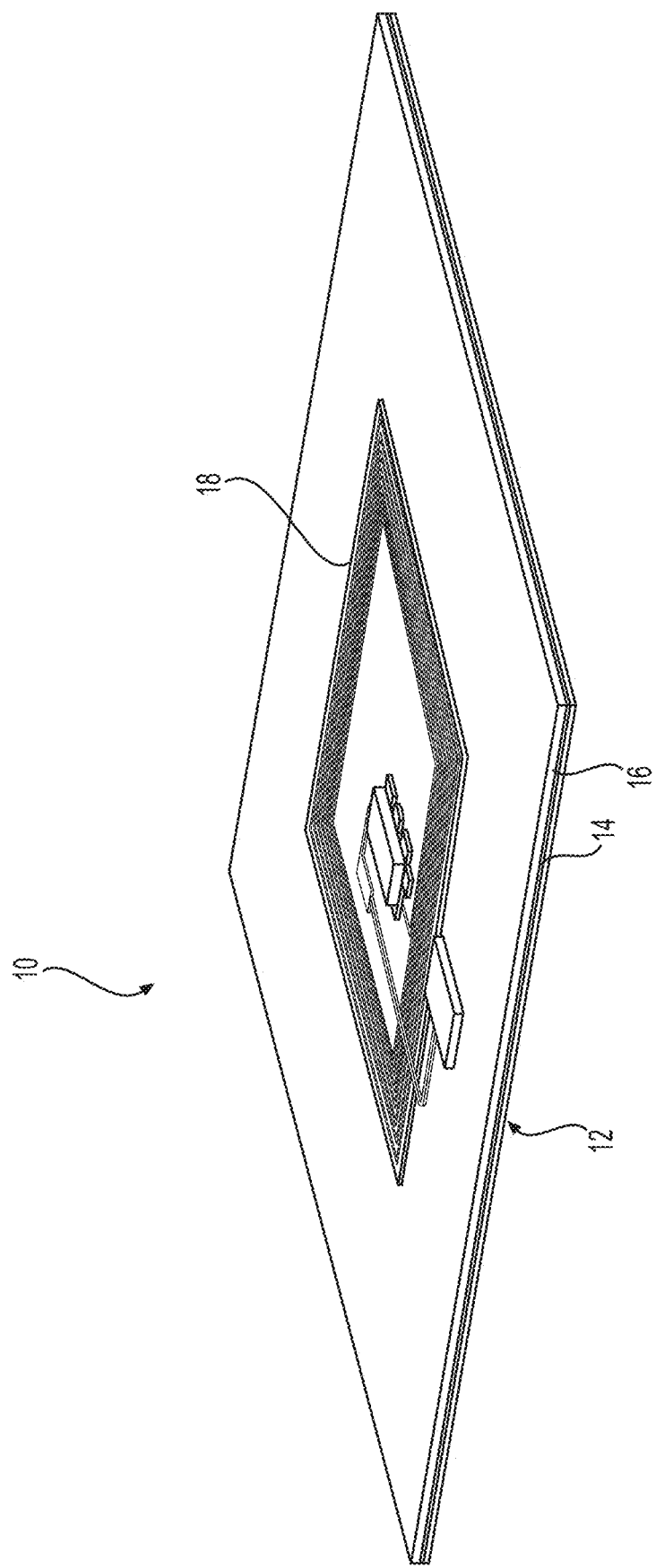
FIG. 1 is a perspective view of an RFID magnet according to the present invention.
Figure 2:
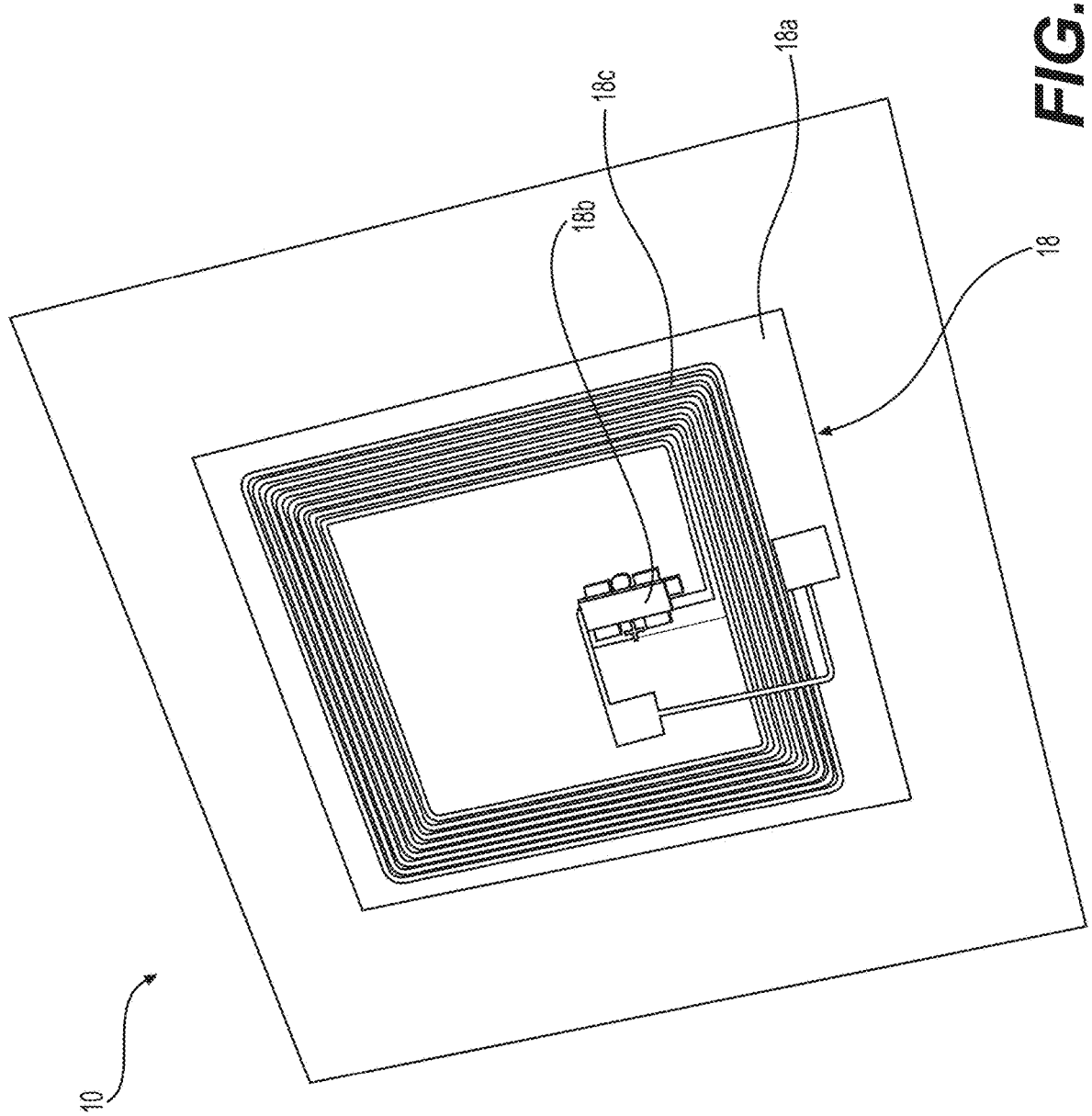
FIG. 2 is a front planar view of an RFID magnet according to the present invention.
Figure 3:
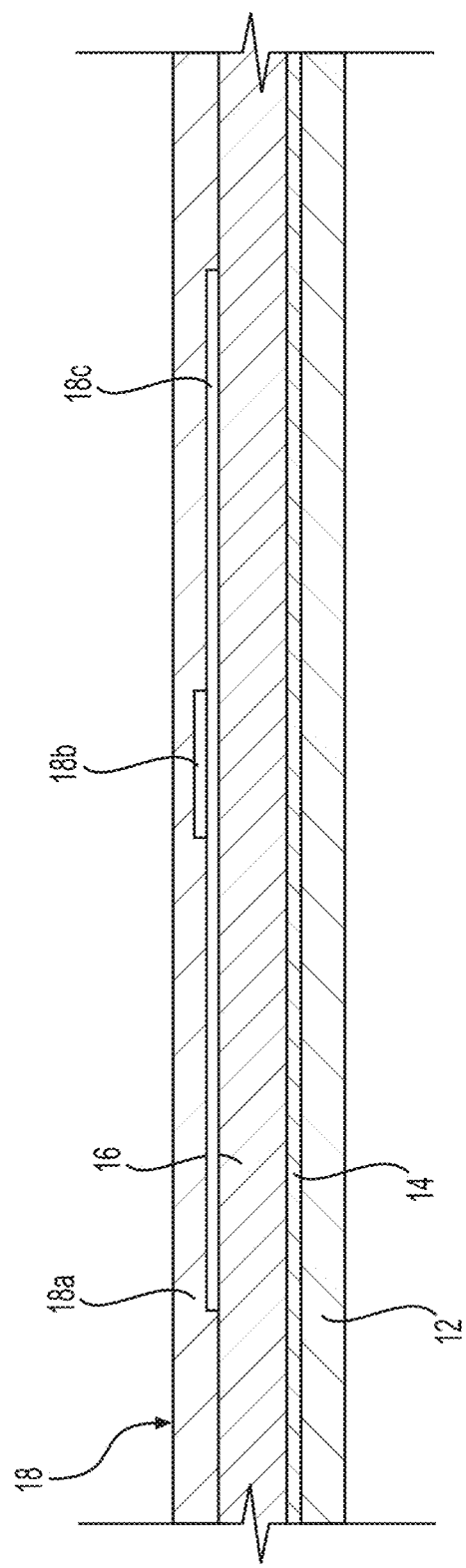
FIG. 3 is a partial cross-sectional view of the RFID magnet shown in FIGS. 1 and 2.

An RFID magnet 10 according to the present invention is shown in FIGS. 1 and 2. The magnet 10 comprises a magnetized or magnetizable material layer 12, a rubber based adhesive layer 14, a rubber steel layer 16 (i.e. a magnetic interference blocking layer), and an RFID label 18 (or RFID tag 18). The RFID label 18 comprises a film layer 18a and an RFID reader. The RFID reader has at least two parts including an RFID chip 18b (e.g. microchip) that stores and processes information and an RFID antenna 18c to receive and transmit an RFID signal. Further, it is noted that the magnetizable material layer 12 can be magnetized to become a magnetized material layer 12.

The rubber based adhesive layer 14 adheres or laminates the rubber steel layer 16 onto the magnetized or magnetizable material layer 12. The RFID label 18 is attached (e.g. adhered or laminated) onto the rubber steel layer 16 (e.g. onto the upper surface of the rubber steel layer 16).

Figure 4:
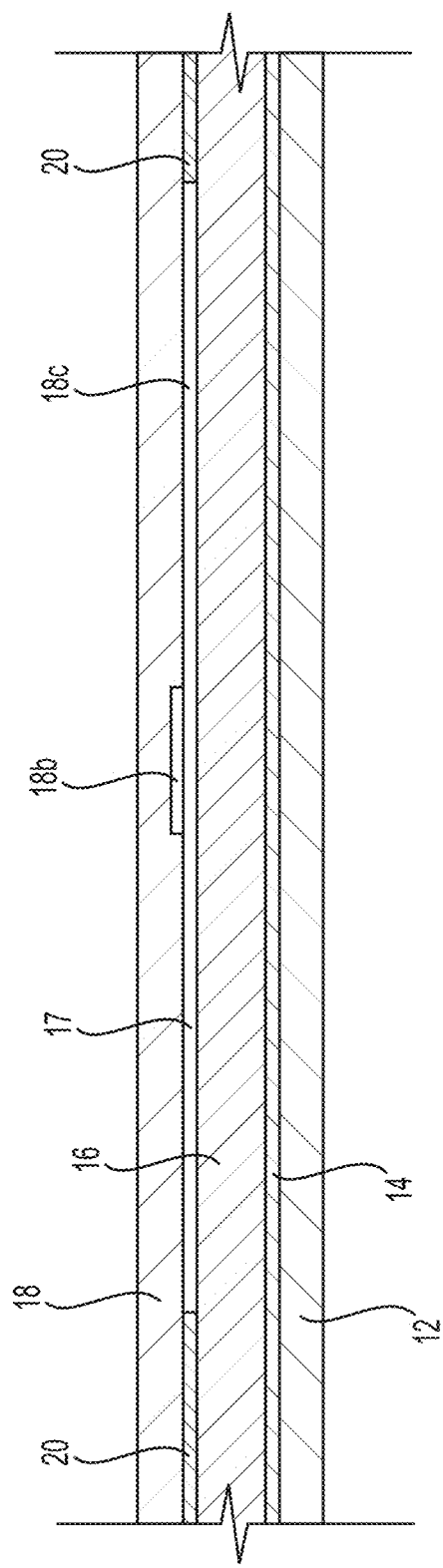
FIG. 4 is a partial cross-sectional view of another RFID magnet according to the present invention.

As shown in FIG. 2, the RFID label 18 comprises the film layer 18a (e.g. clear resin film) covering and protecting the RFID chip 18b and the RFID antenna 18c. At least the outer portions of the film layer 18a are adhered or laminated onto the rubber steel layer 16 (e.g. upper surface of rubber steel layer 16). For example, the back of the film layer 18a is provided with an adhesive layer 20 (FIG. 4), and the RFID chip 18b and the RFID antenna 18c (e.g. conductive coil) are adhered onto the back of the film layer 18a prior to applying the RFID label 18 onto the rubber steel layer 16. The film layer 18a covers and protects the RFID chip 18b and the RFID antenna 18c during use or application of the RFID magnet 10.

The rubber steel layer 16, for example, is a calendared sheet of material. The rubber steel layer 16, for example, is a sheet (e.g. a rectangular or square sheet), strip, roll or web cut into pieces of RubberSteel Magnetic Receptive Material manufactured by Magnum Magnetics, Marietta, Ohio, 45750, Toll Free 800.258.0991. The RubberSteel Magnetic Receptive Material has the follow features:

1) available plain or with multiple laminates (printable, dry erase, chalkboard, etc.) and adhesives;
2) non-magnetic (not attracted to metal surfaces) and lighter than magnetic stock for easy printing;
3) rustproof and durable; and
4) Class A Fire Rating: For example, a 10 mil RubberSteel with a matte white vinyl printable surface has a Class A Fire Rating per test method ASTM E84.

The specifications of the RubberSteel Magnetic Receptive Material are as follows:

1) 0.025 in. (0.64 mm) thickness is standard, and other thicknesses may be special ordered;
2) sheeted material is available up to 48 in. (1.219 m) wide in plain, single or double-laminate;
3) roll material is available up to 48 in. (1.219 m) wide in plain or single-laminate material only in lengths ranging from 10 ft. (3.05 m) to 100 ft. (30.48 m), and double-laminate material is available in cut blanks only; and
4) optional laminates: white matte vinyl, write on/wipe off film, and indoor adhesive with liner.

The rubber steel layer 16 provides a barrier and blocks the magnetic field of the magnetized or magnetizable material layer 12 from the RFID chip 18. The magnetic receptive surface blocks interference of the magnetized or magnetizable material layer 12 when scanning the RFID chip 18 of the magnet 10.

EXAMPLE #1

The RFID magnet 10 described above, wherein the thickness of the layers is a follows:

| Layer | Thickness |
|---|---|
| magnetized material layer 12 | 0.012 inches |
| rubber based adhesive layer 14 | 0.001 inches |
| rubber steel layer 16 | 0.025 inches |

The RFID magnet 10 can be consistently scanned to provide a positive scan each time.

EXAMPLE #2

An RFID magnet 10 according to EXAMPLE #1; however, the RFID label 18 includes a film layer 18a and an RFID chip 18b is replaced with an RFID chip having no film layer 18a with the RFID chip directly adhered to an upper surface of the rubber steel layer 16.

Method of Making

EXAMPLE #1

The method of making the RFID label (e.g. RFID label 10) according to the present invention comprises or consists of:
1) providing a magnetized or magnetizable material layer (e.g. magnetize material layer 10);
2) providing a magnetic interference blocking layer (e.g. rubber steel layer 16);
3) adhering or laminating the magnetized material layer 10 and magnetic interference blocking layer (e.g. rubber steel layer 16) together; and
4) applying an RFID label 18 having a film layer 18a and RFID chip 18b onto the rubber steel layer 16.

EXAMPLE #2

The method of making the RFID label 10 according to the present invention comprises or consists of:
1) providing the magnetized or magnetizable material layer 10;
2) providing the magnetic interference blocking layer (e.g. rubber steel layer 16);
3) adhering or laminating the magnetized or magnetizable material layer 10 and magnetic interference blocking layer (e.g. rubber steel layer 16) together; and
4) adhering or laminating an RFID chip 20 directly onto the rubber steel layer 16.

The invention claimed is:

1. A radio-frequency identification (RFID) magnet, comprising:
   a magnetized or magnetizable material layer;
   a magnetic interference blocking layer adhered or laminated onto the magnetized or magnetizable material layer, the magnetic interference blocking layer is a rubber steel layer; and
   an RFID label or tag adhered or laminated onto the magnetic interference blocking layer, the RFID label comprising an RFID chip connected to an RFID antenna.

2. The magnet according to claim 1, further comprising an adhesive layer located between the magnetized or magnetizable material layer and the rubber steel layer.

3. The magnet according to claim 2, wherein the adhesive layer is a rubber based adhesive layer.

4. The magnet according to claim 2, wherein the rubber steel layer has a thickness of 0.025 inches, wherein the magnetized or magnetizable material layer has a thickness of 0.012 inches, and wherein the rubber based adhesive layer has a thickness of 0.001 inches.

5. The magnet according to claim 2, further comprising another adhesive layer located between the rubber steel layer and both the RFID chip and RFID antenna.

6. The magnet according to claim 1, wherein the RFID label or tag comprises comprising a film layer covering and protecting the RFID chip and RFID antenna.

7. The magnet according to claim 6, wherein the film adheres or laminates the RFID chip and RFID antenna to the magnetic field blocking layer.

8. The magnet according to claim 1, wherein the magnetic field blocking layer is configured to block interference by the magnetized or magnetizable material layer when the magnet is being scanned to provide consistent positive scanning.

9. The magnet according to claim 1, wherein the rubber steel layer has a thickness of 0.025 inches.

10. The magnet according to claim 9, wherein the magnetized or magnetizable material layer has a thickness of 0.012 inches.

11. The magnet according to claim 1, further comprising an adhesive layer located between the rubber steel layer and both the RFID chip and RFID antenna.

12. The magnet according to claim 1, wherein the RFID chip stores and processes information.

13. The magnetic according to claim 12, wherein the RFID antenna receives and transmits an RFID signal.

14. The magnetic according to claim 1, wherein the RFID antenna receives and transmits an RFID signal.

* * * * *